United States Patent Office 2,778,680
Patented Jan. 22, 1957

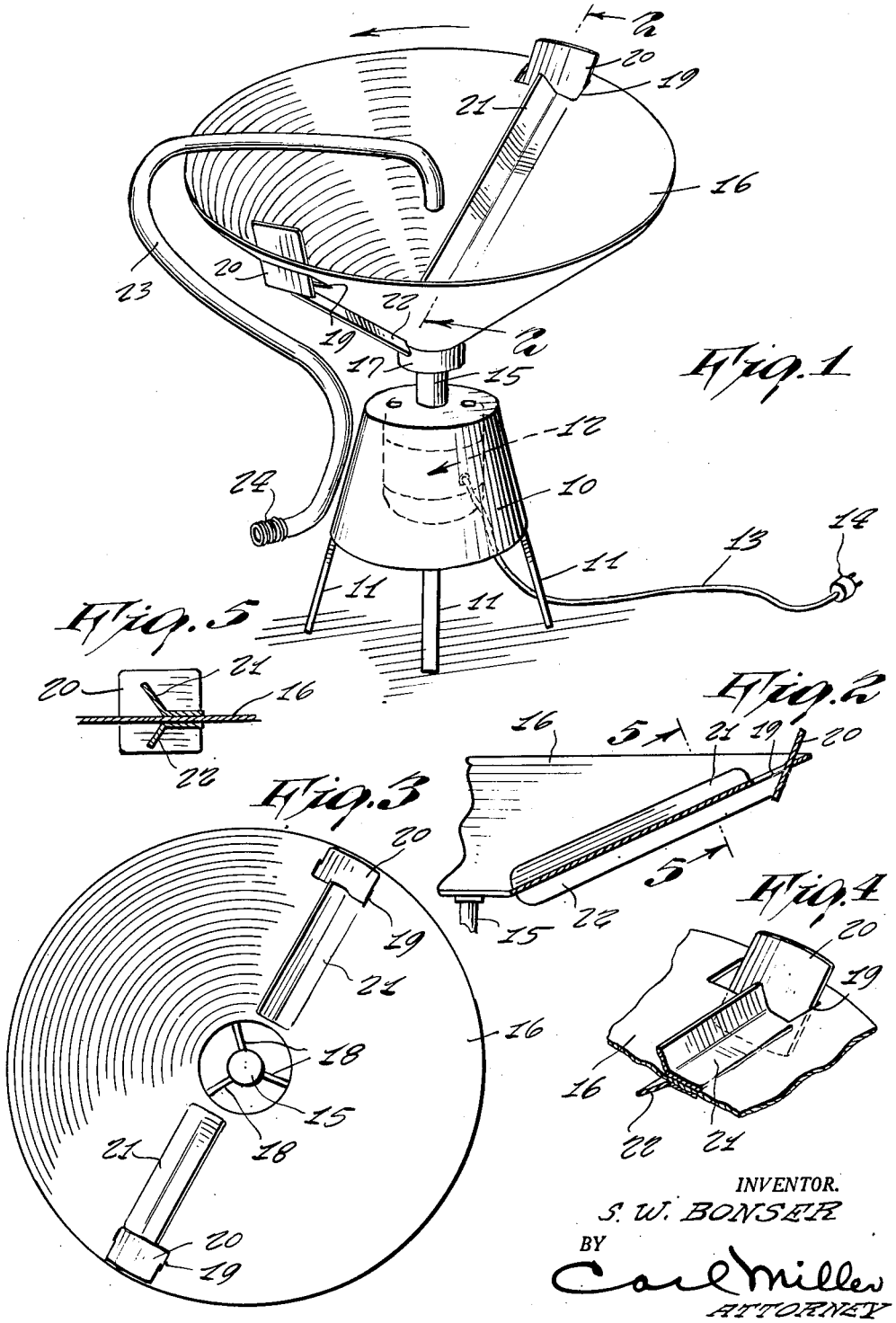

2,778,680

WATER SPRINKLER FOR LAWNS, GARDENS, TRUCK FARMS AND GOLF COURSES, AND THE LIKE

Stanley W. Bonser, Gilbert, Pa.

Application December 5, 1955, Serial No. 551,098

3 Claims. (Cl. 299—63)

This invention relates to water sprinklers.

It is an object of the present invention to provide a water sprinkler for lawns, gardens, truck farms and golf courses or the like which will disperse about 50 feet of very fine spray or mist.

It is another object of the present invention to provide a water sprinkler of the above type which embodies the impeller principle and includes both water and air baffles for creating a fine spray which is almost a mist in fineness.

Other objects of the invention are to provide a water sprinkler bearing the above objects in mind which is of simple construction, has a minimum number of parts, is inexpensive to manufacture and effective in use.

For other objects and a better understanding of the invention, reference may be had to the following detailed description taken in connection with the accompanying drawing, in which:

Figure 1 is a perspective view of a preferred embodiment of the present invention;

Fig. 2 is a fragmentary vertical section view thereof taken along the line 2—2 of Fig. 1;

Fig. 3 is a top plan view;

Fig. 4 is a fragmentary perspective view of a portion thereof; and

Fig. 5 is a sectional view taken along the line 5—5 of Fig. 2.

Referring now more in detail to the drawing, 10 represents a hollow, frusto-conical base member supported on the angularly spaced legs 11 and within which is mounted an electric motor indicated generally at 12, the motor 12 including insulated cord 13 and a male plug 14 for connection to a suitable source of power.

The drive shaft 15 of the motor extends upwardly through the base 10 and fixedly mounts at the upper end thereof the hollow, conical impeller 16 by means of the cylindrical portion 17 and the braces 18 (Fig. 3). The impeller 16 near the upper periphery is provided with a pair of oppositely disposed rectangular openings 19 to the outer edges of which are secured the inclined rectangular plates 20 projecting above and below the impeller, substantially as illustrated. A water baffle 21 of V-shaped cross section (Fig. 5) is secured to the upper surface of the impeller 16 in radial alignment with the openings 19 and baffle 20, a water baffle 21 being provided at each side and extending from the opening 19 to a point just short of the central opening thereof.

An air baffle 22 of V-shaped cross section is secured to the undersurface of the impeller 16 in vertical alignment with each of the baffles 21, the air baffle 22 extending beyond the openings 19 into contact with the lower portion of the baffles 20 (Fig. 2).

A supply of water is supplied continuously to the impeller 16 during rotational movement thereof under the action of motor 12 by means of a hose 23 having a coupling 24 for connection to a supply of water.

Although the device is shown rotated by means of the electric motor 12, it will be readily apparent to those skilled in the art that any other means may be employed, for example a small gasoline motor. Furthermore, although the device has been shown with a hollow, conical impeller 16, it will be readily apparent that the device will also function by employing a flat circular disc of substantially the same diameter.

In operation, the plug 14 when connected to a supply of power will operate motor 12 to rotate the impeller 16 in a counter-clockwise or clockwise direction. Upon the discharge of water thereinto by means of the hose 23, the baffles 21 and 20 will discharge a fine spray of water outwardly, the air baffles 22 admixing the spray with air particles and creating an almost mist-like dispersion. The water baffles 21 during rotational movement of the impeller will throw the water outwardly against the baffle 20, while the air baffles 22 will throw the air outwardly against the same baffles 20, causing a fine dispersion of mist-like quality to be dispersed upwardly and outwardly from the baffles 20 over an area of approximately 50 feet. The air baffles 22 have the same angulation as the water baffles 21 and force air through the openings 19 against the baffle 20, to increase the distance and also to break the water into small particles, thereby almost creating a mist.

While various changes may be made in the detail construction, it shall be understood that such changes shall be within the spirit and scope of the present invention as defined by the appended claims.

Having thus set forth and disclosed the nature of my invention, what is claimed is:

1. A water sprinkler comprising an impeller, means for rotating said impeller, oppositely disposed peripheral openings in said impeller, a first baffle extending downwardly through the outer edges of said openings and angled thereto, water baffle means for directing the water in said impeller against said baffle, and air baffle means for discharging the air upwardly against said first baffle to finely disperse the water particles and to create a spray of mist-like quality over a relatively large area, said impeller means comprising a hollow conical member, said means for rotating said conical member comprising a base member, an electric motor mounted within said base member and including a drive shaft extending upwardly therethrough, said impeller being mounted at the small end thereof on said drive shaft, and means for supplying current to said motor, said openings in said impeller being substantially rectangular, said first baffle plate comprising a rectangular plate secured to the outer edges of said openings and extending downwardly and inwardly towards the center of said impeller, said water baffle means comprising a pair of elongated baffles of V-shaped cross section aligned radially with said openings and first baffles and adapted to direct the water outwardly thereagainst, said air baffle means comprising complementary baffles of V-shaped cross section secured to the undersurface of said impeller in vertical alignment with said water baffles and being adapted to direct the air particles outwardly against said first baffles and to diffuse with said water particles into a fine mist-like spray.

2. A water sprinkler as set forth in claim 1, wherein each said V-shaped water baffle means and V-shaped air baffle means comprise a pair of angularly related longitudinal legs, one leg of said V-shaped water baffle means being secured to the upper surface of said impeller with the other leg thereof extending upwardly and towards the direction of rotation of said impeller, one leg of said V-shaped air baffle means being secured to the undersurface of said impeller with the other leg thereof extending downwardly and towards the direction of rotation of said impeller.

3. A water sprinkler as set forth in claim 2, wherein said V-shaped water baffle and said V-shaped air baffle are disposed in parallel arrangement relative to said impeller and are of combined V-shaped cross section transversely thereof.

References Cited in the file of this patent

UNITED STATES PATENTS

| | | |
|---|---|---|
| 804,767 | Raidl | Nov. 14, 1905 |
| 1,330,218 | Rieber | Feb. 10, 1920 |
| 1,442,786 | Scheminger | Jan. 16, 1923 |
| 1,692,617 | Bowen | Nov. 20, 1928 |